US009742586B2

(12) United States Patent
Yang et al.

(10) Patent No.: US 9,742,586 B2
(45) Date of Patent: *Aug. 22, 2017

(54) INTELLIGENT HOST ROUTE DISTRIBUTION FOR LOW LATENCY FORWARDING AND UBIQUITOUS VIRTUAL MACHINE MOBILITY IN INTERCONNECTED DATA CENTERS

(71) Applicant: Cisco Technology, Inc., San Jose, CA (US)

(72) Inventors: Yibin Yang, San Jose, CA (US); Chia Tsai, Cupertino, CA (US); Liqin Dong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/577,052

(22) Filed: Dec. 19, 2014

(65) Prior Publication Data

US 2015/0103841 A1    Apr. 16, 2015

Related U.S. Application Data

(63) Continuation of application No. 13/721,781, filed on Dec. 20, 2012, now Pat. No. 8,953,624.

(51) Int. Cl.
*H04L 12/46* (2006.01)
*H04L 12/713* (2013.01)
*H04L 12/751* (2013.01)

(52) U.S. Cl.
CPC ............ *H04L 12/462* (2013.01); *H04L 45/02* (2013.01); *H04L 45/586* (2013.01)

(58) Field of Classification Search
CPC ....... H04L 12/462; H04L 45/02; H04L 45/586
See application file for complete search history.

(56) References Cited

U.S. PATENT DOCUMENTS

| | | | |
|---|---|---|---|
| 8,122,113 | B2 | 2/2012 | Harrington et al. |
| 8,160,063 | B2 | 4/2012 | Maltz et al. |
| 8,175,009 | B2 | 5/2012 | Tallet et al. |
| 8,509,248 | B2 | 8/2013 | Mehta et al. |
| 8,625,616 | B2 | 1/2014 | Vobbilisetty et al. |
| 8,705,513 | B2 | 4/2014 | Van Der Merwe et al. |
| 8,953,624 | B2 * | 2/2015 | Yang ..................... H04L 45/586 370/392 |

(Continued)

*Primary Examiner* — Duc C Ho
(74) *Attorney, Agent, or Firm* — Edell, Shapiro & Finnan, LLC (57) ABSTRACT

Techniques are presented for distributing host route information of virtual machines to routing bridges (RBridges). A first RBridge receives a routing message that is associated with a virtual machine and is sent by a second RBridge. The routing message comprises of mobility attribute information associated with a mobility characteristic of the virtual machine obtained from an egress RBridge that distributes the routing message. The first RBridge adds a forwarding table attribute to the routing message that indicates whether or not the first RBridge has host route information associated with the virtual machine in a forwarding table of the first RBridge. The first RBridge also distributes the routing message including the mobility attribute information and the forwarding table attribute, to one or more RBridges in the network.

20 Claims, 7 Drawing Sheets

(56) References Cited

U.S. PATENT DOCUMENTS

| | | | |
|---|---|---|---|
| 8,976,794 B2* | 3/2015 | Xiong | H04L 45/745 370/392 |
| 2011/0019678 A1 | 1/2011 | Mehta et al. | |
| 2011/0292942 A1 | 12/2011 | Imai | |
| 2011/0299413 A1* | 12/2011 | Chatwani | H04L 12/4625 370/252 |
| 2012/0166618 A1 | 6/2012 | Dahod et al. | |
| 2012/0294309 A1 | 11/2012 | Cai et al. | |
| 2013/0148663 A1 | 6/2013 | Xiong | |
| 2013/0223449 A1* | 8/2013 | Koganti | H04L 49/70 370/392 |
| 2013/0266011 A1 | 10/2013 | Nachum et al. | |

* cited by examiner

FIG.1

CASE 1:

| ROUTE USED | RB14 | RB16 | RB24 |
|---|---|---|---|
| NEXTHOP | HOST ROUTE VM2 | | |
| REWRITES | RB26 | OUTER MACs | OUTER MACs |
| | TRILL HEADER, INNER MACs, OUTER MACs | | |

FIG.2A

CASE 2:

| ROUTE USED | RB14 | RB16 | RB24 |
|---|---|---|---|
| NEXTHOP | HOST ROUTE VM2 | | HOST ROUTE VM2 |
| REWRITES | RB24 | OUTER MACs | RB26 |
| | TRILL HEADER, INNER MACs, OUTER MACs | | TRILL HEADER, INNER MACs, OUTER MACs |

FIG.2B

CASE 3: 230

| | RB14 | RB16 | RB24 |
|---|---|---|---|
| ROUTE USED | DEFAULT ROUTER | HOST ROUTE VM2 | |
| NEXTHOP | RB16 | RB26 | |
| REWRITES | TRILL HEADER, INNER MACs, OUTER MACs | TRILL HEADER, INNER MACs, OUTER MACs | OUTER MACs |

FIG.2C

CASE 4: 240

| | RB14 | RB16 | RB24 |
|---|---|---|---|
| ROUTE USED | DEFAULT ROUTER | HOST ROUTE VM2 | HOST ROUTE VM2 |
| NEXTHOP | RB16 | RB24 | RB26 |
| REWRITES | TRILL HEADER, INNER MACs, OUTER MACs | TRILL HEADER, INNER MACs, OUTER MACs | TRILL HEADER, INNER MACs, OUTER MACs |

FIG.2D

| | CASE 1 | CASE 2 | CASE 3 | CASE 4 |
|---|---|---|---|---|
| LATENCY/BANDWIDTH | ← | ↕ | ↕ | → |
| BORDER LEAF FIB SCALABILITY | ← | ← | → | → |
| INGRESS LEAF FIB SCALABILITY | → | → | → | ← |
| NON-UNIQUE NICKNAME | → | ← | → | ← |
| INTRA-DC MOBILITY | → | → | ↕ | ← |
| INTER-DC MOBILITY | → | → | ← | ← |

INTELLIGENT HOST ROUTE DISTRIBUTION FOR LOW LATENCY FORWARDING AND UBIQUITOUS VIRTUAL MACHINE MOBILITY IN INTERCONNECTED DATA CENTERS

This patent application is a continuation of U.S. patent application Ser. No. 13/721,781, which was filed on Dec. 20, 2012, and has issued as U.S. Pat. No. 8,953,624.

TECHNICAL FIELD

The present disclosure relates to determining a host route for communications between virtual machines in a network environment.

BACKGROUND

Routing bridges ("RBridges"), as defined in the Internet Engineering Task Force (IETF) Request for Comments (RFC) 6325, may be configured to manage network communications of one or more physical servers. The physical servers in the network may be arranged in a plurality of data centers, and they may host one or more virtual machines. Thus, the RBridges that manage the network communications of the physical servers may also manage communications of the one or more virtual machines.

Virtual machines may "move" within the network when they are reassigned or otherwise hosted by different physical servers. The virtual machines may send communications (e.g., packets) to each other. In one example, when virtual machines are hosted by physical servers that are in the same data center, the virtual machines may communicate with each other directly (via the RBridges in the data center) by sending packets to the addresses associated with each of the virtual machines. In another example, when virtual machines are hosted by physical servers that are in different data centers, the virtual machines may communicate with each other indirectly by sending packets to a border RBridge in one data center to route the packets to another border RBridge in another data center. In this latter example, the virtual machines may send the packets to the border RBridges based on routing information (called a host route) that identifies the next hop border RBridge and the communication path for communications between the virtual machines.

DESCRIPTION OF EXAMPLE EMBODIMENTS

Overview

Techniques are presented herein for distributing host route information of virtual machines to routing bridges (referred to hereinafter as "RBridges") in a network. At a first RBridge in a network, a routing message is received. The routing message is associated with a virtual machine in the network, and the routing message is sent by a second RBridge. The routing message comprises mobility attribute information associated with mobility characteristics of the virtual machine obtained from an egress RBridge that distributes the routing message. The first RBridge adds a forwarding table attribute to the routing message that indicates whether or not the first RBridge has routing information associated with the virtual machine in a forwarding table of the first RBridge. The first RBridge then distributes the routing message that indicates the mobility attribute information and the forwarding table attribute to one or more routing bridges in the network.

Additionally, at an RBridge (e.g., the second RBridge) in the network, the routing message associated with the virtual machine is received. The routing message is sent by an egress RBridge that distributes the routing message and it comprises nickname attribute information associated with the egress RBridge and mobility attribute information associated with mobility characteristics of the virtual machine. The second RBridge determines whether the nickname attribute indicates the egress RBridge nickname is unique. If so, the second RBridge keeps the next hop of the routing message to be associated with the egress RBridge. If not, the second RBridge updates the next hop of the routing message to be associated with the egress RBridge.

Example Embodiments

Figure 1:
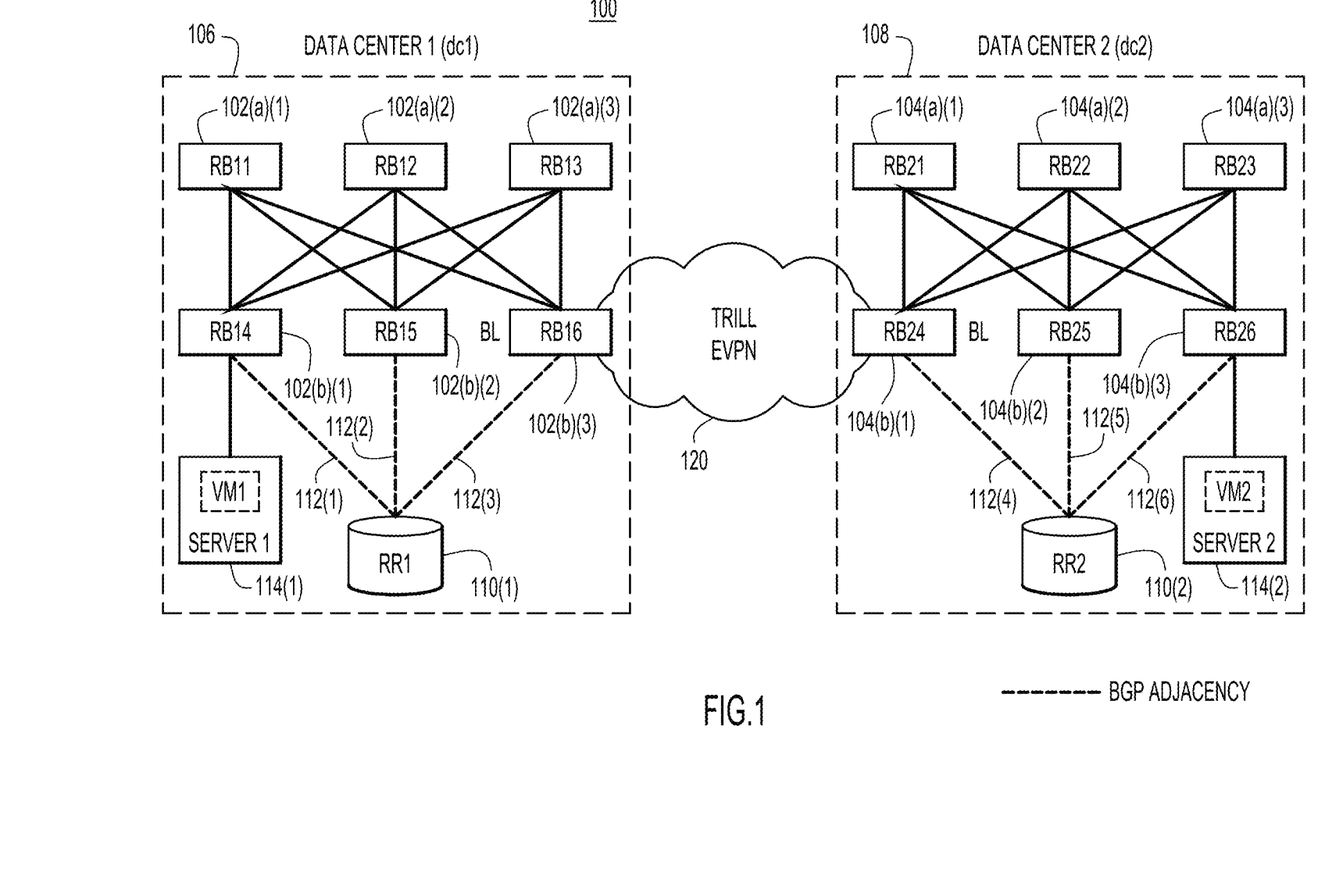
FIG. 1 shows an example network topology including routing bridges (RBridges) that are configured to distribute host route information of virtual machines in the network.

The techniques described hereinafter involve distributing host route information of virtual machines to routing bridges in a network to enable communications between the virtual machines in the network. An example topology (hereinafter "network") is shown at reference numeral 100 in FIG. 1. The network 100 comprises a plurality of routing bridges (also referred to hereinafter as "RBridges" or "RBs" as defined by the Internet Engineering Task Force (IETF) Request for Comments (RFC) 6325). The RBridges are shown at reference numerals 102(a)(1)-102(a)(3), 102(b)(1)-102(b)(3), 104(a)(1)-104(a)(3) and 104(b)(1)-104(b)(3). In FIG. 1, the RBridges 102(a)(1)-102(a)(3) are labeled as "RB 11" to "RB 13," respectively, RBridges 102(b)(1)-102(b)(3) are labeled as "RB 14" to "RB 16," respectively, RBridges 104(a)(1)-104(a)(3) are labeled as "RB 21" to "RB 23," respectively, and RBridges 104(b)(1)-104(b)(3) are labeled as "RB 24" to "RB 26," respectively.

The network 100 also shows two data centers ("DCs") at reference numerals 106 and 108. Data center 106 is referred to hereinafter as "data center 1" or "DC1" and data center 108 is referred to hereinafter as "data center 2" or "DC2." RBridges 102(a)(1)-102(a)(3) and 102(b)(1)-102(b)(3) reside in data center 1, while RBridges 104(a)(1)-104(a)(3) and 104(b)(1)-104(b)(3) reside in data center 2. Data center 1 and data center 2 are connected to each other by a provider network 120. For example, RBridge 102(b)(3) in data center 1 is configured to exchange communications with RBridge 104(b)(1) in data center 2.

Each of the RBridges in the network 100 is arranged in a particular configuration based on its connectivity to other devices in the network 100. For example, the RBridges 102(a)(1)-102(a)(3) in data center 1 and RBridges 104(a)(1)-104(a)(3) in data center 2 are arranged in a first configuration in the network 100 as "spine" RBridges. Likewise, the RBridges 102(b)(1)-102(b)(3) in data center 1 and RBridges 104(b)(1)-104(b)(3) in data center 2 are arranged in a second configuration in the network as "leaf" RBridges. The spine RBridges and leaf RBridges in each data center are shown to be fully meshed. That is, in each data center, every spine RBridge is connected to every leaf RBridge via network links, and every leaf RBridge is connected to every spine RBridge via the network links.

The designation of the RBridges $102(a)(1)$-$102(a)(3)$ and $104(a)(1)$-$104(a)(3)$ as spine RBridges and of the RBridges $102(b)(1)$-$102(b)(3)$ and $104(b)(1)$-$104(b)(3)$ as leaf RBridges indicates the device configuration within the network 100. All of the RBridges may be the same type (e.g., Open Systems Interconnection (OSI) model Layer 2 or Layer 3 devices).

Data center 1 and data center 2 each has a BGP route reflector, shown at reference numerals 110(1) and 110(2). Route reflector 110(1) is also referred to hereinafter as "route reflector 1" or "RR1" and route reflector 110(2) is also referred to hereinafter as "route reflector 2" or "RR2." RR1 and RR2 peer with all of the leaf RBridges in their corresponding data centers. In FIG. 1, RR1 peers with RBridges $102(b)(1)$-$102(b)(3)$ via border gateway protocol (BGP) adjacency links 112(1)-112(3), and RR2 peers with RBridges $104(b)(1)$-$104(b)(3)$ via BGP adjacency links 112(4)-112(6).

FIG. 1 also shows two server devices ("servers") at reference numerals 114(1) and 114(2). Server 114(1) may be referred to hereinafter as "server 1" and server 114(2) may be referred to hereinafter as "server 2." Server 1 and server 2 are directly connected to corresponding leaf RBridges, and the leaf RBridges may manage communications of the one or more server devices. The servers 114(1) and 114(2) are physical devices that are configured to host one or more virtual machines shown as VM1 and VM2. The virtual machines may be hosted on software or hardware components of the servers 114(1) and 114(2). It should be appreciated that the network 100 may have additional servers that host additional virtual machines.

The virtual machines may be assigned and reassigned to be hosted by different servers in the network. For example, virtual machine 2 may initially be hosted by server 2 and later may be reassigned to be hosted by server 1. Likewise virtual machine 1 may initially be assigned to be hosted by server 1 and may later be reassigned to be hosted by server 2. The assignment and migration of virtual machines in the network 100 to the server devices may be performed by a controller device (not shown in FIG. 1) and may depend, for example, on network conditions (e.g., bandwidth, processing capacity, etc. of the servers) or established network policies. Thus, when the virtual machines are reassigned to new servers, the virtual machines are said to "move" within the network 100.

The virtual machines are configured to exchange communications with each other within the network 100. For example, when virtual machines are hosted by physical servers that are located in the same data center, the virtual machines may communicate with each other directly via the RBridges in the data center. In this example, the virtual machines may communicate with each other by sending packets directly to the addresses associated with each of the virtual machines. In another example, when the virtual machines are hosted by physical servers that are located in different data centers (as shown in FIG. 1, where VM1 is hosted by server 1 in DC1 and where VM2 is hosted by server 2 in DC2), the virtual machines may communicate with each other by sending packets indirectly to each other. In this example, the virtual machines may send packets to a border leaf RBridge in one data center to route the packets to another border leaf RBridge (or the destination virtual machine itself) in another data center. The virtual machines send the packets to the border leaf RBridge based on routing information stored in a routing table available to the virtual machines. This routing information is also known as a host route. Each virtual machine has a corresponding host route, and the host route information is distributed to the RBridges as described by the techniques herein.

It should be appreciated that data may be distributed within the network 100 using a Transport Interconnection of Lots of Links (TRILL) protocol, while routing information (e.g., host routes of the virtual machines) may be distributed within the network 100 using the BGP protocol via the route reflectors 110(1) and 110(2). To support the interconnectivity between data centers (e.g., data center 1 and data center 2) one or more of the RBridges may be designated as border leaf RBridges or "border leafs." The border leafs may also be referred to as "provider edge devices" or "PEs." For example, in FIG. 1, RBridge $102(b)(3)$ is deployed as a border leaf for data center 1 to enable connectivity to data center 2 via RBridge $104(b)(1)$, which is deployed as a border leaf for data center 2.

TRILL Ethernet Virtual Private Network (EVPN) technology is a Layer 2 technology which may connect TRILL data centers (e.g., data center 1 and data center 2 in FIG. 1) over Multiprotocol Label Switching (MPLS)/Internet Protocol (IP) provider networks. An example TRILL-EVPN provider network is shown at reference numeral 120. When TRILL-EVPN is used, a new BGP route is defined to distribute TRILL nicknames associated with the RBridges among the data centers. If the nicknames of the RBridges are globally unique across data centers, traffic can be forwarded from one virtual machine to another virtual machine without requiring an intermediate IP or Media Access Control (MAC) address lookup of the destination virtual machine. For example, in FIG. 1, if virtual machine 1 is attempting to send a packet to virtual machine 2, and a nickname assigned to RBridge $104(b)(3)$ (which is connected to server 2 that hosts virtual machine 2) is globally unique, traffic can be forwarded from virtual machine 1 to virtual machine 2 directly without requiring any address lookups. Otherwise, TRILL nickname rewrites are required and are performed by the border leafs.

If virtual machine 1 in FIG. 1 attempts to communicate with virtual machine 2 over IP, the host route information of virtual machine 2 needs to be distributed and installed in several RBridges in data center 1 and data center 2, since virtual machine 1 and virtual machine 2 are in different data centers. The host route information of virtual machine 2 may originate from the routing bridge that manages the server hosting virtual machine 2, and this host route information is then distributed to the other routing bridges in the network 100. Thus, the routing bridge that manages the server hosting virtual machine 2 is referred to as an "egress routing bridge" since it distributes the host route information to the other routing bridges in the network 100. Since the host route information of virtual machine 2 needs to be distributed ultimately to the routing bridge that manages the server hosting virtual machine 1, the routing bridge that manages the server hosting virtual machine 1 is referred to as an "ingress routing bridge" since it receives the host route information originating from the egress routing bridge (via the other routing bridges in the network 100). Thus, in the example of communications between virtual machine 1 and virtual machine 2, routing bridge $104(b)(3)$ is the egress routing bridge for the host route information of virtual machine 2 and routing bridge $102(b)(1)$ is the ingress routing bridge for the host route information of virtual machine 2. It should be appreciated that the egress routing bridge 104(*b*)(3) may be the destination routing bridge for packet communications from virtual machine 1 destined for virtual machine 2, since routing bridge 104(*b*)(3) manages the server that hosts virtual machine 2. Likewise, it should be appreciated that the ingress routing bridge 102(*b*)(1) may be the source routing bridge for packet communications from virtual machine 1 destined for virtual machine 2, since routing bridge 102(*b*)(1) manages the server that hosts virtual machine 1.

The techniques described herein address which RBridges the host route information is distributed to and what the particular next hop (e.g., which RBridge) the host route for virtual machine 2 should utilize. That is, as a packet is sent from virtual machine 1 to virtual machine 2, some of the RBridges in the host route will install the host route information in hardware components. These RBridges may be required to perform address lookup operations (e.g., IP or MAC address lookups), while other RBridges that do not install the host route will simply forward the packet along the default route or based on nickname lookups. Thus, it is important to determine which RBridges will install the host route information. These techniques are described hereinafter.

When virtual machine 1 sends a packet to virtual machine 2, the packet is received and forwarded along a route by several RBridge in the network 100 before the packet ultimately reaches virtual machine 2. This route may be determined by a BGP protocol. In one example, server 1, which hosts virtual machine 1, sends the packet to RBridge 102(*b*)(1). RBridge 102(*b*)(1) then sends the packet to RBridge 102(*b*)(3). Since RBridge 102(*b*)(3) is a border leaf, it can send the packet from data center 1 to data center 2. Specifically, RBridge 102(*b*)(3) forwards the packet to RBridge 104(*b*)(1), which is the border leaf for data center 2. RBridge 104(*b*)(1) sends the packet to RBridge 104(*b*)(3). RBridge 104(*b*)(3) is connected to server 2, and thus, RBridge 104(*b*)(3) forwards the packet to server 2 ultimately to reach virtual machine 2 which is hosted by server 2. For simplicity, this path is described as the host forwarding path for virtual machine 2. It should be appreciated that other host forwarding paths for other virtual machines may be determined.

Reference is now made to FIGS. 2A-2D. FIGS. 2A-2D show example tables of scenarios of the RBridges receiving and installing the host route information associated with virtual machine 2. In each of these scenarios, for communications from virtual machine 1 to virtual machine 2, it is assumed that each border leaf enables selective Forwarding Information Base (FIB) downloads of the host route and that the border leafs always distribute the default routes within their own data centers. That is, border leaf 102(*b*)(3) and border leaf 104(*b*)(1) are configured to install routes (e.g., host routes) in hardware FIB tables only for the host routes associated with virtual machines with active flows. Border leaf 102(*b*)(3) distributes the default route information to all RBridges in data center 1 (e.g., RBridges 102(*b*)(1) and 102(*b*)(2)), and border leaf 104(*b*)(1) distributes the default route information to all RBridges in data center 2 (e.g., RBridges 104(*b*)(2) and 104(*b*)(3)).

Figure 2A:
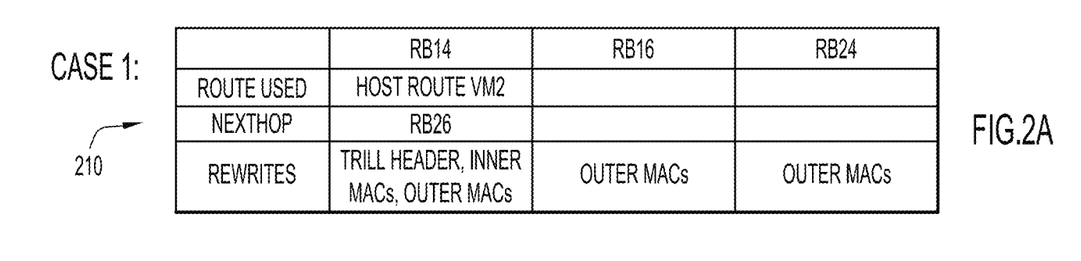
FIGS. 2A-2D show example tables of scenarios of the RBridges receiving the host route information associated with a virtual machine in the network.

Referring to FIG. 2A, an end-to-end routing scenario ("Case 1") 210 is depicted where the RBridge 102(*b*)(1) that is coupled to server 1 is the only RBridge to install the host route associated with virtual machine 2 in its FIB. As shown in FIG. 2A, in this end-to-end scenario (or "one-hop scenario"), the next hop in the host route installed in RBridge 102(*b*)(1) is listed as "RB 26" or RBridge 104(*b*)(3) (which is connected to server 2 that hosts virtual machine 2). In this scenario, RBridge 102(*b*)(1) receives the IP packet from virtual machine 1 and rewrites the TRILL header, inner MAC address and outer MAC address for the packet. RBridge 102(*b*)(1) forwards the packet to RBridge 102(*b*)(3). Since RBridge 102(*b*)(3) is not the next hop, it does not perform an IP address lookup on the packet, and thus, it does not rewrite the TRILL header or inner MAC address. Instead, RBridge 102(*b*)(3) simply rewrites the outer MAC address based on egress RBridge nickname lookup and forwards the packet to RBridge 104(*b*)(1). Upon receiving the packet, RBridge 104(*b*)(1) also only rewrites the outer MAC address of the packet based on egress RBridge nickname lookup, since RBridge 104(*b*)(1) is also not the next hop, and forwards the packet to RBridge 104(*b*)(3) for ultimate transmission to virtual machine 2. Thus, in the end-to-end scenario in FIG. 2A, only RBridge 102(*b*)(1) ("RB 14"), which is the ingress RBridge, needs to install the host route information of virtual machine 2.

Figure 2B:
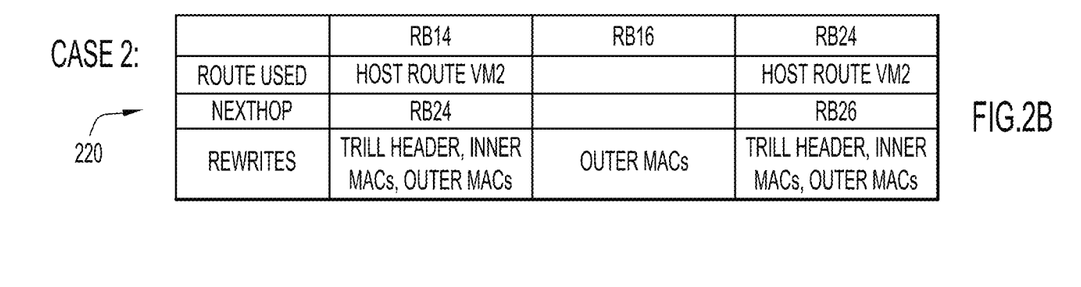

FIG. 2B shows a first two-hop scenario ("Case 2") 220 for forwarding the packet from virtual machine 1 to virtual machine 2. In FIG. 2B, the next hop in the host route installed in RBridge 102(*b*)(1) is listed as "RB 24" or RBridge 104(*b*)(1). Thus, RBridge 102(*b*)(1) receives the IP packet from virtual machine 1 and rewrites the TRILL header, inner MAC address and outer MAC address for the packet. RBridge 102(*b*)(1) forwards the packet to RBridge 102(*b*)(3). Since RBridge 102(*b*)(3) is not the next hop, it only rewrites the outer MAC address of the packet based on egress RBridge nickname lookup and forwards the packet to RBridge 104(*b*)(1). Since RBridge 104(*b*)(1) is the next hop, it rewrites the TRILL header, inner MAC address and outer MAC address for the packet. Additionally, it resolves a new next hop, based on its installed host route, to indicate "RB 26" or RBridge 104(*b*)(3) and forwards the packet to RBridge 104(*b*)(3) for ultimate transmission to virtual machine 2. Thus in this first two-hop scenario, RBridge 102(*b*)(1) and RBridge 104(*b*)(1) install the host route information of virtual machine 2.

Figure 2C:
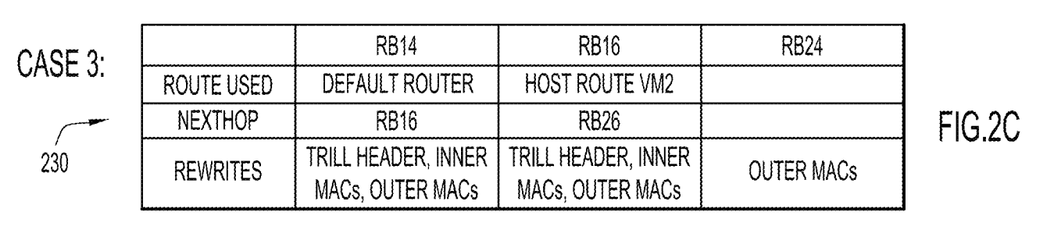

FIG. 2C shows a second two-hop scenario ("Case 3") 230 for forwarding the packet. In FIG. 2C, no host route is installed in RBridge 102(*b*)(1) and the next hop in the default route installed in RBridge 102(*b*)(1) is listed as "RB 16" or RBridge 102(*b*)(3). Thus, RBridge 102(*b*)(1) receives the IP packet from virtual machine 1 and rewrites the TRILL header, inner MAC address and outer MAC address for the packet. RBridge 102(*b*)(1) forwards the packet to RBridge 102(*b*)(3). However, in this scenario, RBridge 102(*b*)(1) uses a default route (previously received from RBridge 102(*b*)(3)), not the host route, to forward the packet. Since RBridge 102(*b*)(3) is the next hop, it also rewrites the TRILL header, inner MAC address and outer MAC address. RBridge 102(*b*)(3) also resolves a new next hop, based on its installed host route, to indicate "RB 26" or RBridge 104(*b*)(3) and forwards the packet to RBridge 104(*b*)(1). RBridge 104(*b*)(1) is not the nexthop, and thus, it only rewrites the outer MAC address of the packet based on egress RBridge nickname lookup and forwards the packet to RBridge 104(*b*)(3) for ultimate transmission to virtual machine 2. Thus, in this second two-hop scenario, RBridge 102(*b*)(3) installs the host route information of virtual machine 2.

Figure 2D:
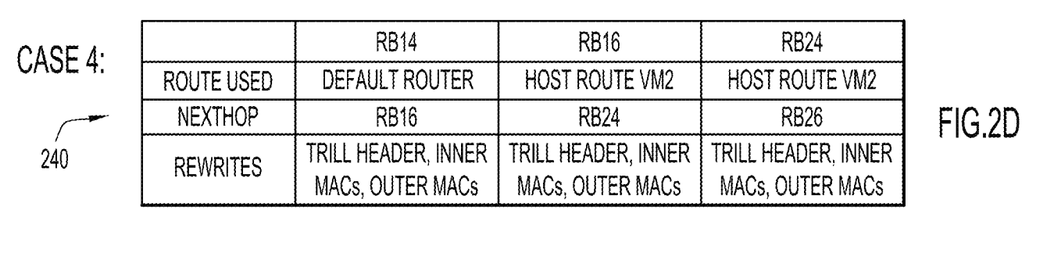

FIG. 2D shows a three-hop scenario ("Case 4") 240 for forwarding the packet. In FIG. 2D, no host route is installed in RBridge 102(*b*)(1) and the next hop in the host route installed in RBridge 102(*b*)(1) is listed as "RB 16" or RBridge 102(*b*)(3). Thus, RBridge 102(*b*)(1) receives the IP packet from virtual machine 1 and rewrites the TRILL header, inner MAC address and outer MAC address for the packet. RBridge 102(b)(1) forwards the packet to RBridge 102(b)(3). However, in this scenario, RBridge 102(b)(1) uses a default route (previously received from RBridge 102(b)(3)), not the host route, to forward the packet. Since RBridge 102(b)(3) is the next hop, it also rewrites the TRILL header, inner MAC address and outer MAC address. RBridge 102(b)(3) also resolves a new next hop, based on its installed host route, to indicate "RB 24" or RBridge 104(b)(1) and forwards the packet to RBridge 104(b)(1). Since RBridge 104(b)(1) is the next hop, it also rewrites the TRILL header, inner MAC address and outer MAC address and resolves a new next hop, based on its installed host route, to indicate "RB 26" or RBridge 104(b)(3). The packet is then forwarded to RBridge 104(b)(3) for ultimate transmission to virtual machine 2. Thus, in the three-hop scenario, RBridges 102(b)(3) and 104(b)(1) install the host route information of virtual machine 2.

Figure 3:
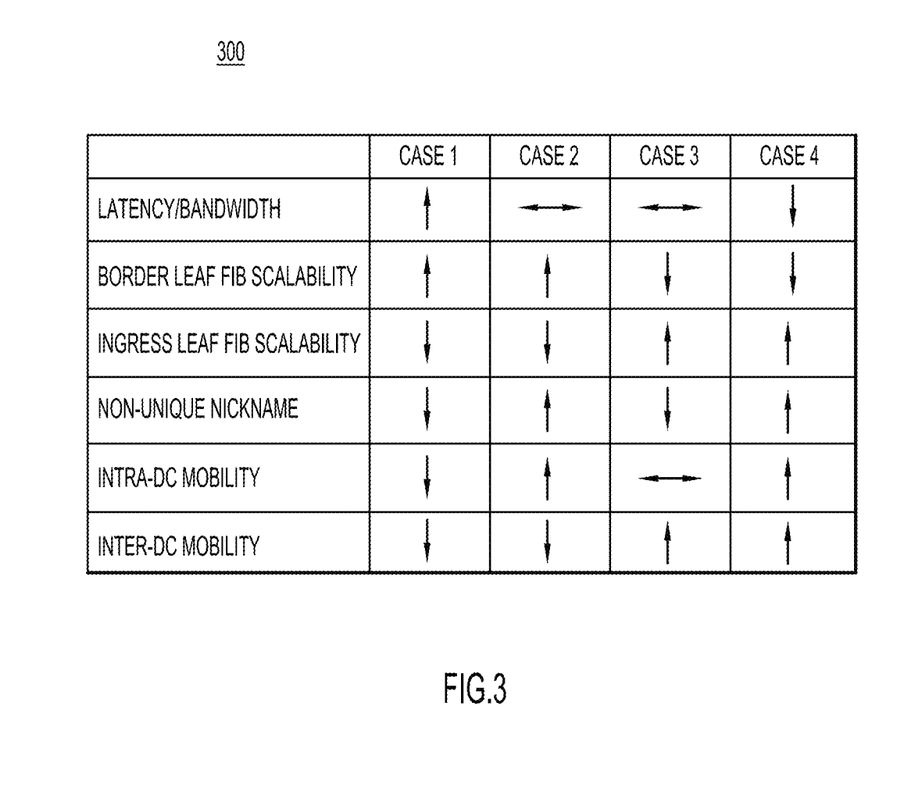
FIG. 3 shows an example table depicting comparisons between the scenarios of FIGS. 2A-2D.

Reference is now made to FIG. 3, which shows a table 300 depicting comparisons between the example scenarios of FIGS. 2A-3D. In general, there may be situations where one or more of the above described scenarios are favorable. That is, network conditions may be such that one or more scenario is preferable to other scenarios. As shown in FIG. 3, for network latency and/or bandwidth considerations, the end-to-end scenario is most desirable (indicated by the upward pointing arrow) since this scenario involves only one IP address lookup and one TRILL header rewrite (at RBridge 102(b)(1)). On the other hand, the three-hop scenario is least desirable (indicated by the downward pointing arrow) from a network latency/bandwidth perspective, since multiple IP address lookups and TRILL header rewrites are required. Both the first two-hop scenario and the second two-hop scenario have a same medium level of desirability (indicated by the horizontal pointing arrows) since the same number of IP address lookups and TRILL header rewrites are required for these scenarios.

For border leaf forwarding table scalability, the end-to-end scenario and the first two-hop scenario are the most desirable. This is due to the fact that in both of these scenarios the border leaf of data center 1 (RBridge 102(b)(3)) does not install the host route information. On the other hand, the second two-hop and three-hop scenarios are the least desirable for border leaf scalability since the host route is installed in RBridge 102(b)(3) in both of these scenarios.

For ingress leaf (e.g., RBridge 102(b)(1)) forwarding table scalability, the second two-hop and three-hop scenarios are the most desirable since, in these scenarios, RBridge 102(b)(1) does not install the host route information and instead utilizes a default route to forward the packet. On the other hand, the end-to-end and the first two-hop scenarios are the least desirable since the host routes are installed at RBridge 102(b)(1). In this example, if RBridge 102(b)(1) has sufficient hardware forwarding table entries to hold some of the inter-data center host routes, it may install them so that the burden on the hardware forwarding table of its local border leaf (RBridge 102(b)(3)) is reduced. Otherwise, the hardware forwarding table of the local border leaf may need to hold all inter-data center host routes, which may cause a bottleneck for packet exchanges.

For nickname reuse, the first two-hop scenario and the three-hop scenario are the most desirable since there is no requirement for the destination RBridge (RBridge 104(b)(3)) that is connected to server 2 that hosts virtual machine 2) to be globally unique. That is, in this scenario, no RBridges in data center 1 rely on a globally unique nickname of RBridge 104(b)(3) to forward the packet to virtual machine 2. On the other hand, the end-to-end scenario and the second two-hop scenario are least desirable since they work only if the nickname for RBridge 104(b)(3) is globally unique and identifiable to the RBridges in data center 1.

For situations where virtual machine 2 moves to another server within data center 2 (i.e., intra-data center virtual machine mobility), the first two-hop scenario and the three-hop scenario are the most desirable since the host route updates resulting from the virtual machine move are limited to RBridges within data center 2. That is, in the first two-hop scenario and three-hop scenario, the initial next hop in the host route at RBridge 102(b)(1) indicates a border leaf (either the border leaf of data center 1 or the border leaf of data center 2), which are not affected by the virtual machine movement. The end-to-end scenario, however, is least desirable since the host route update would need to travel through both data center 1 and data center 2. The second two-hop scenario has a medium level of desirability, given that the host route update traverses only data center 2.

For situations where virtual machine 2 moves to another server in a different data center, not shown in FIG. 1 (i.e., inter-data center virtual machine mobility), the second two-hop scenario and the three-hop scenario are the most desirable since the inter-data center move is hidden from the RBridge 102(b)(1). On the other hand, the end-to-end scenario and the first two-hop scenario are the least desirable since the host route update needs to travel through the new data center and through data center 1, resulting in large network traffic disruptions.

Thus, as described above, the distribution of the host route information to the RBridges depends on the network circumstances. Since one scenario may be desirable for certain network conditions, but may be undesirable for other network conditions, a procedure is needed to determine when a particular scenario should be invoked. The techniques herein introduce new BGP attributes to communicate the network circumstances among BGP peers (e.g., RBridges) so that an intelligent host route distribution can be performed. These new BGP attributes include a nickname attribute, a mobility attribute and a forwarding information base (FIB) attribute. The nickname attribute indicates if a nickname assigned to a destination RBridge or "egress RBridge" of the host forwarding path (e.g., RBridge 104(b)(3)) is globally unique or not. In the host route example described above, the nickname attribute is ultimately used to determine if the egress RBridge can be used as a next hop by an RBridge in data center 1. The mobility attribute indicates the mobile behavior of a virtual machine (e.g., virtual machine 2). This attribute may indicate three characters: a "no mobility" character, an "intra-data center move" character and an "inter-data center move" character. In the host route example described above, the mobility attribute is used to determine which border leaf should be used as a next hop across data centers. The FIB attribute indicates if a host route is installed in the hardware FIB of a border leaf or not and is used to determine host route sharing in a local border leaf. In the host route example described above, when an ingress RBridge (e.g., RBridge 102(b)(1)) needs to remove inter-data center host routes due to its hardware FIB overflow, it should first remove those which are already installed in the border leaf of its data center so that no extra burden is put on the hardware FIB of the border leaf, as the host routes are already present in the border leaf. As a BGP message is sent to RBridges in data center 1 and data center 2, one or more of these attributes may be modified, added or removed to ensure proper distribution and installation of the host route to RBridges in the network 100.

For example, in an ideal scenario, where virtual machine 2 never moves and the egress RBridge has a nickname that is globally unique, when the egress RBridge sends a route update to RR2, it indicates as such via nickname and mobility attributes. Upon receiving host route for virtual machine 2, RBridge 104(*b*)(1) (the border leaf for data center 2) re-advertises the host route to the border leaf for data center 1 (RBridge 102(*b*)(3)) with the egress RBridge (RBridge 104(*b*)(3)) as the next hop. During the re-advertisement, the mobility attribute is retained while the nickname attribute is removed. RBridge 102(*b*)(3) then adds the FIB attribute (indicating that the host route is not installed in its FIB table yet) and sends the host route to RR1. RBridge 102(*b*)(3) also sends a default route, with itself as a next hop, as described above. RBridge 102(*b*)(1) always accepts the default route from RR1, though in certain circumstances, it may reject the inter-DC host routes from RR1 through outbound route filtering (ORF). If RBridge 102(*b*)(1) has sufficient hardware FIB space to hold the inter-DC host routes, it will accept the host route from RR1 (sent by RBridge 102(*b*)(3)). In this scenario, it will then enjoy the fastest forwarding of packets to virtual machine 2 (corresponding to the end-to-end scenario in FIG. 2A), since the nickname of the egress RBridge is globally unique. If RBridge 102(*b*)(1) does not have sufficient hardware FIB space to hold the inter-DC host route, it will use the default route advertised to it by RBridge 102(*b*)(3) (corresponding to the second two-hop scenario in FIG. 2C).

In another example, the virtual machine 2 can perform intra-data center moves or the nickname associated with the egress RBridge (RBridge 104(*b*)(3)) is not globally unique. The egress RBridge sends a route update to RR2, indicating so via the nickname and mobility attributes. Upon receiving the host route with the attributes, RBridge 104(*b*)(1) re-advertises the host route to RBridge 102(*b*)(3), with itself listed as the next hop. RBridge 104(*b*)(1) lists itself as the next hop in order to hide any inter-data center moves by virtual machine 2 or non-uniqueness of the nickname associated with the egress RBridge. During the re-advertisement, the mobility attribute is retained while the nickname attribute is removed. RBridge 102(*b*)(3), upon receiving the host route, sends the host route to RR1, listing RBridge 104(*b*)(1) as the next hop. Additionally, RBridge 102(*b*)(3) adds the FIB attribute, which indicates that virtual machine 2 is not yet installed in its hardware FIB. As described above, RBridge 102(*b*)(3) (which is the border leaf for data center 1) also sends a default route, listing itself as the next hop. If the ingress RBridge (RBridge 102(*b*)(1)) has sufficient hardware FIB space to hold the inter-data center host routes, RBridge 102(*b*)(1) will accept the host route from RR1 (corresponding to the first two-hop scenario in FIG. 2B). If RBridge 102(*b*)(1) does not have sufficient hardware FIB space to hold the inter-data center host route, it will use the default route advertised by RBridge 102(*b*)(3) (corresponding to the three-hop scenario in FIG. 2D).

In another example, virtual machine 2 can perform inter-data center moves. When the egress RBridge sends the route update to RR2, it indicates as such via the mobility attribute. Upon receiving the host route with the attribute, border leaf 104(*b*)(1) re-advertises the host route to RBridge 102(*b*)(3). If the nickname for the egress RBridge is globally unique, the egress RBridge is used as the next hop. Otherwise, RBridge 104(*b*)(1) is used as the next hop. During the re-advertisement, the mobility attribute is retained while the nickname attribute is removed. RBridge 102(*b*)(3) then adds the FIB attribute (indicating that the host route is not installed in its FIB table yet) and sends the host route to RR1. RBridge 102(*b*)(3) also sends a default route, with itself as a next hop, as described above. Since the mobility attribute indicates inter-data center moves, RBridge 102(*b*)(1) will not install the host route, even if it has sufficient hardware FIB space to hold the inter-data center host routes. In this example, it can use ORF to reject those inter-data center host routes whose mobility attributes indicate inter-data center moves. This corresponds to the second two-hop scenario in FIG. 2C (if the nickname of the egress RBridge is globally unique) or the three-hop scenario in FIG. 2D (if the nickname of the egress RBridge is not globally unique).

Figure 4A:
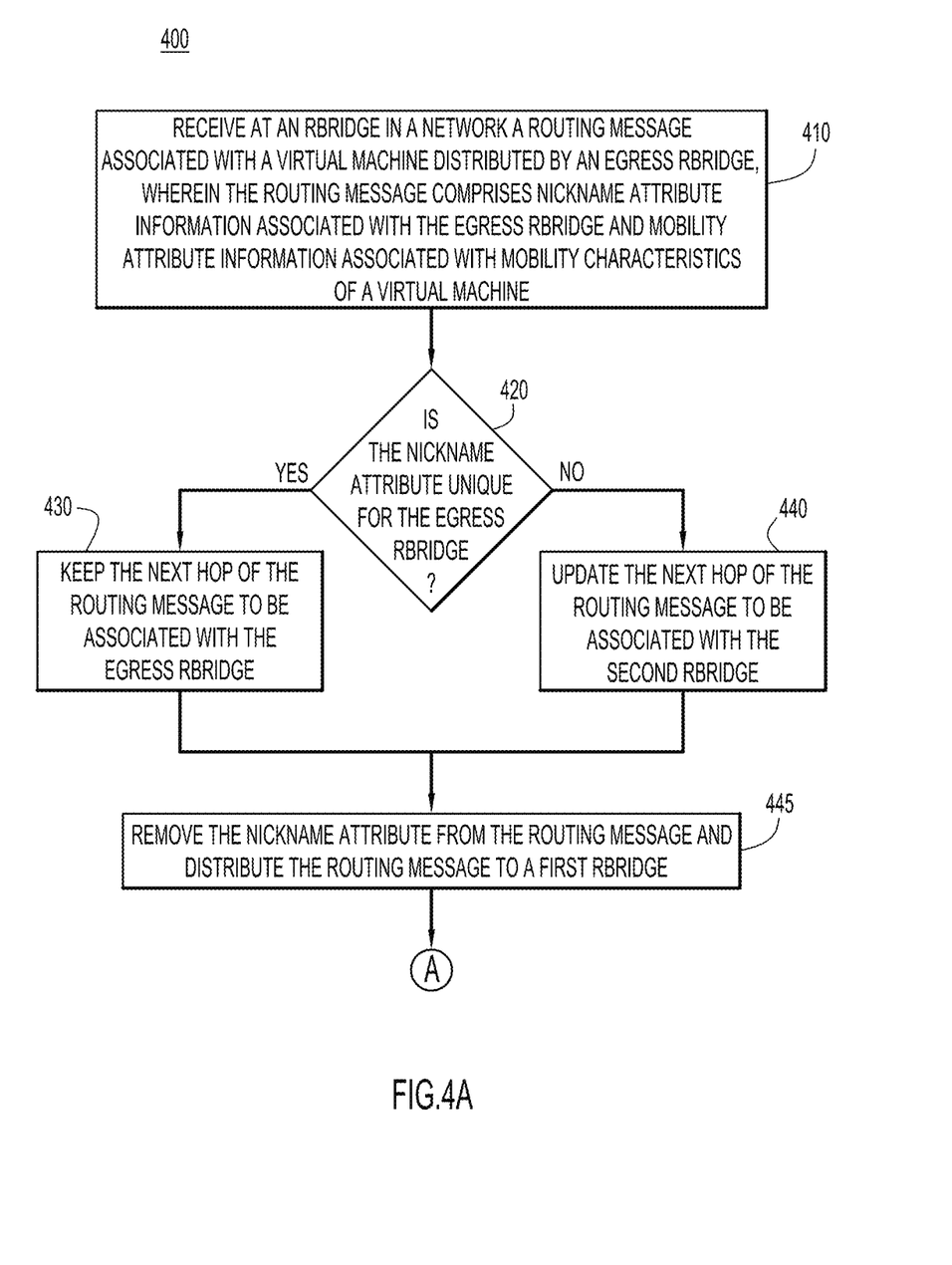
FIGS. 4A and 4B show example flow charts depicting operations performed by one or more of the RBridges to distribute the host route information of the virtual machines in the network.
Figure 4B:
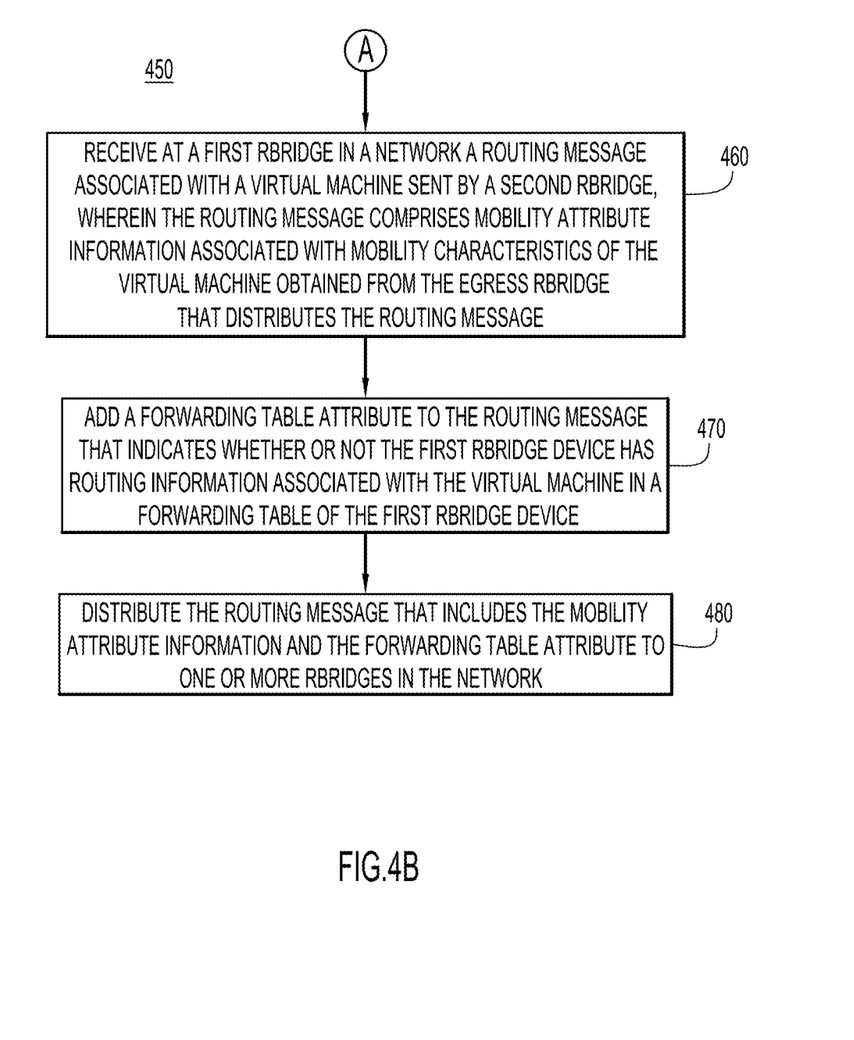

Reference is now made to FIGS. 4A and 4B. FIGS. 4A and 4B show example flow charts 400 and 450, respectively, depicting operations performed by one or more of the RBridges to distribute the host route information of the virtual machine in the network. In particular, FIG. 4A shows operations performed by an RBridge (e.g., RBridge 104(*b*)(1), referred to in FIGS. 4A and 4B as a "second RBridge"), and FIG. 4B shows operations performed by another RBridge (e.g., RBridge 102(*b*)(3), referred to in FIGS. 4A and 4B as a "first RBridge"). Referring first to FIG. 4A, at operation 410, the second RBridge in a network receives a routing message associated with a virtual machine. The routing message is sent by an egress RBridge (e.g., RBridge 104(*b*)(3)), and the routing message comprises nickname attribute information associated with the egress RBridge and mobility attribute information associated with mobility characteristics of a virtual machine. At operation 420, the second RBridge determines whether the nickname attribute indicates the egress RBridge nickname is unique. If so, the second RBridge, at operation 430, keeps the next hop of the routing message to be associated with the egress RBridge. If not, the second RBridge, at operation 440, updates the next hop of the routing message to be associated with the second RBridge. At operation 445, the second RBridge removes the nickname attribute from the routing message and distributes the routing message to the first RBridge. The process continues at reference numeral A, which is referred to in FIG. 4B.

In FIG. 4B, at operation 460, the first RBridge receives a routing message associated with the virtual machine sent by the second RBridge. The routing message comprises mobility attribute information associated with mobility characteristics of the virtual machine. At operation 470, the first RBridge adds a forwarding table attribute to the routing message that indicates whether or not the first RBridge has routing information associated with the virtual machine (e.g., a host route associated with the virtual machine) in a forwarding table of the first RBridge. At operation 480, the first RBridge distributes the routing message that includes the mobility attribute information and the forwarding table attribute to an ingress RBridge, e.g., RBridge 102(*b*)(1) in the network that manages the server that hosts virtual machine 1. The ingress RBridge can evaluate the mobility attribute information to determine whether or not to accept and install the routing information. For example, if the mobility attribute indicates the virtual machine can perform an inter-data center move, the ingress RBridge will reject the host routes and will use the default route received from the border leaf in its data center (e.g., RBridge 102(*b*)(3)).

Figure 5:
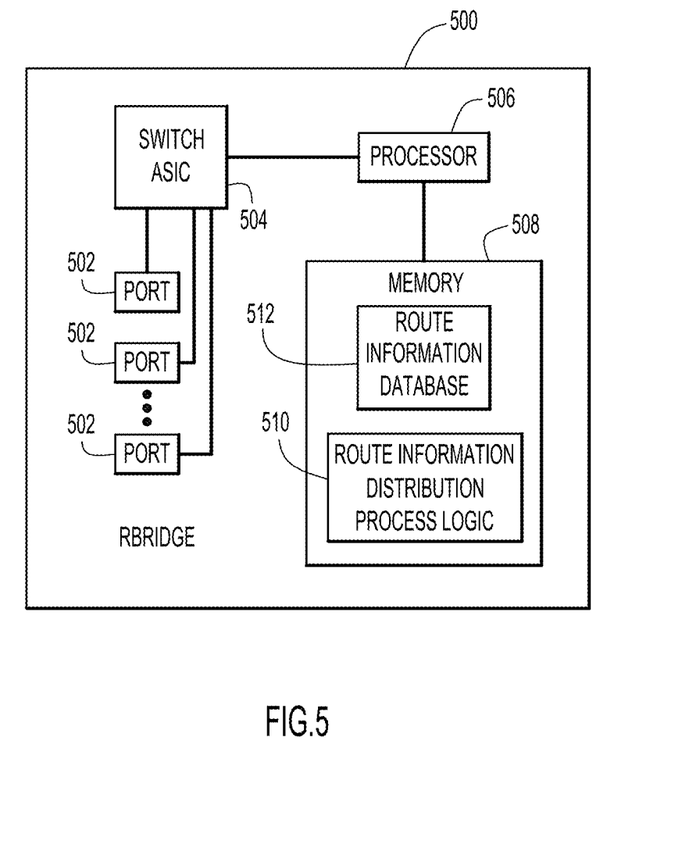
FIG. 5 shows an example block diagram of the RBridges configured to distribute host route information associated with virtual machines in the network.

Reference is now made to FIG. 5. FIG. 5 shows an example block diagram of an RBridge 500 that is configured to distribute host route information associated with virtual machine 2 in the network 100. The RBridge 500 depicted in FIG. 5 is representative of any of the RBridges in FIG. 1. For example, the RBridge 500 may be the border leaf (RBridge 102(*b*)(3)) for data center 1 in FIG. 1. The RBridge 500 comprises, among other components, a plurality of ports 502, a switch application specific integrated circuit (ASIC) 504, a processor 506 and a memory 508. The ports 502 receive communications (e.g., frames) from devices in the network 100 and are configured to send communications to devices the network 100. For example, the ports 502 send and receive TRILL frames and BGP messages from other RBridges in the network 100. The ports 502 are coupled to the switch ASIC 504. The switch ASIC 504 receives instructions from the processor 506 and forwards communications to an appropriate one of the ports 502 for transmission to a destination network device in the network 100. The switch ASIC 504 is coupled to the processor 506. The processor 506 is, for example, a microprocessor or microcontroller that is configured to execute program logic instructions (i.e., software) for carrying out various operations and tasks of the RBridge 500, as described above. For example, the processor 506 is configured to execute route information distribution process logic 510 to determine and distribute a host route for one or more virtual machines in the network 100, according to the techniques described above. The route information distribution process logic 510 also instructs the processor to update a route information database 512 (e.g., FIB table stored in a hardware component of the RBridge 500) to store the host route information. The functions of the processor 506 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 508 may comprise read only memory (ROM), random access memory (RAM), magnetic disk storage media devices, optical storage media devices, flash memory devices, electrical, optical, or other physical/tangible (non-transitory) memory storage devices. The memory 508 stores software instructions for the route information distribution process logic 510. The memory 508 also stores the route information database 512 that, as described above, stores the host route information of one or more virtual machines. Thus, in general, the memory 508 may comprise one or more computer readable storage media (e.g., a memory storage device) encoded with software comprising computer executable instructions and when the software is executed (e.g., by the processor 506) it is operable to perform the operations described for the route information distribution process logic 510.

The route information distribution process logic 510 may take any of a variety of forms, so as to be encoded in one or more tangible computer readable memory media or storage device for execution, such as fixed logic or programmable logic (e.g., software/computer instructions executed by a processor), and the processor 506 may be an ASIC that comprises fixed digital logic, or a combination thereof.

For example, the processor 506 may be embodied by digital logic gates in a fixed or programmable digital logic integrated circuit, which digital logic gates are configured to perform the route information distribution process logic 510. In general, the route information distribution process logic 510 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the RBridges may be performed by one or more computer or machine readable storage media (non-transitory) or device executed by a processor and comprising software, hardware or a combination of software and hardware to perform the techniques described herein.

In summary, a method is provided comprising: at a first routing bridge in a network, receiving a routing message associated with a virtual machine sent by a second routing bridge, wherein the routing message comprises mobility attribute information associated with a mobility characteristic of the virtual machine obtained from an egress routing bridge that distributes the routing message; adding a forwarding table attribute to the routing message that indicates whether or not the first routing bridge has host route information associated with the virtual machine in a forwarding table of the first RBridge; and distributing the routing message that includes the mobility attribute information and the forwarding table attribute to one or more routing bridges in the network.

Additionally, a method is provided comprising: at a routing bridge in a network, receiving a routing message associated with a virtual machine sent by an egress routing bridge that distributes the routing message, wherein the routing message comprises nickname attribute information associated with the egress routing bridge and mobility attribute information associated with a mobility characteristic of the virtual machine; determining whether the nickname attribute indicates the egress routing bridge nickname is unique; keeping the next hop of the routing message to be associated with the egress routing bridge when the egress routing bridge nickname is unique; and updating the next hop of the routing message to be associated with the second routing bridge when the egress routing bridge nickname is not unique.

Furthermore, an apparatus is provided comprising: a plurality of ports; a memory; and a processor coupled to the ports and the memory unit, and configured to: receive a routing message associated with a virtual machine from a routing bridge, wherein the routing message comprises mobility attribute information associated with a mobility characteristic of the virtual machine obtained from an egress routing bridge that distributes the routing message; add a forwarding table attribute to the routing message that indicates whether or not host route information associated with the virtual machine is stored in a forwarding table; and distribute the routing message that includes the mobility attribute information and the forwarding table attribute to one or more routing bridges in the network.

In addition, a computer-readable storage media is provided that is encoded with software comprising computer executable instructions and when the software is executed operable to: receive at a first routing bridge a routing message associated with a virtual machine sent by a second routing bridge, wherein the routing message comprises mobility attribute information associated with a mobility characteristic of the virtual machine obtained from an egress routing bridge that distributes the routing message; add a forwarding table attribute to the routing message that indicates whether or not the first routing bridge has host route information associated with the virtual machine in a forwarding table of the first routing bridge; and forward the routing message that includes the mobility attribute information and the forwarding table attribute to one or more routing bridges in the network.

The above description is intended by way of example only. Various modifications and structural changes may be made therein without departing from the scope of the concepts described herein and within the scope and range of equivalents of the claims.

What is claimed is:

1. A method comprising:
   at a routing bridge in a network, receiving from an egress routing bridge a routing message associated with a virtual machine to which packets are forwarded through the egress routing bridge;
   determining whether a nickname attribute contained in the routing message indicates that a nickname of the egress routing bridge is unique; and
   keeping a next hop of the routing message to be associated with the egress routing bridge when the nickname is determined to be unique.

2. The method of claim 1, further comprising:
   removing the nickname attribute from the routing message.

3. The method of claim 2, further comprising:
   distributing the routing message without the nickname attribute to one or more other routing bridges in the network.

4. The method of claim 1, wherein the routing message further comprises mobility attribute information associated with a mobility characteristic of the virtual machine.

5. The method of claim 4, wherein the routing message comprises a border gateway protocol (BGP) routing message with the nickname attribute and the mobility attribute information.

6. The method of claim 1, wherein, when the nickname is determined not to be unique, updating the next hop of the routing message to be associated with the routing bridge.

7. An apparatus comprising:
   a plurality of communications ports;
   a memory unit; and
   a processor coupled to the ports and the memory unit, and configured to:
      receive from an egress routing bridge in a network a routing message associated with a virtual machine to which packets are forwarded through the egress routing bridge;
      determine whether a nickname attribute contained in the routing message indicates that a nickname of the egress routing bridge is unique; and
      keep a next hop of the routing message to be associated with the egress routing bridge when the nickname is determined to be unique.

8. The apparatus of claim 7, wherein the processor is further configured to remove the nickname attribute from the routing message.

9. The apparatus of claim 8, wherein the processor is further configured to distribute the routing message without the nickname attribute to one or more other routing bridges.

10. The apparatus of claim 7, wherein the routing message further comprises mobility attribute information associated with a mobility characteristic of the virtual machine.

11. The apparatus of claim 10, wherein the routing message comprises a border gateway protocol (BGP) routing message with the nickname attribute and the mobility attribute information.

12. The apparatus of claim 7, wherein the processor is further configured to update the next hop of the routing message to be associated with the routing bridge, when the nickname is determined not to be unique.

13. The apparatus of claim 7, wherein the apparatus comprises another routing bridge.

14. A non-transitory computer-readable storage media encoded with software comprising computer executable instructions that, when executed on a processor, are operable to:
   receive from an egress routing bridge in a network a routing message associated with a virtual machine to which packets are forwarded through the egress routing bridge;
   determine whether a nickname attribute contained in the routing message indicates that a nickname of the egress routing bridge is unique; and
   keep a next hop of the routing message to be associated with the egress routing bridge when the nickname is determined to be unique.

15. The computer-readable storage media of claim 14, wherein the instructions, when executed, are further operable to remove the nickname attribute from the routing message.

16. The computer-readable storage media of claim 15, wherein the instructions, when executed, are further operable to distribute the routing message without the nickname attribute to one or more other routing bridges.

17. The computer-readable storage media of claim 14, wherein the routing message further comprises mobility attribute information associated with a mobility characteristic of the virtual machine.

18. The computer-readable storage media of claim 17, wherein the routing message comprises a border gateway protocol (BGP) routing message with the nickname attribute and the mobility attribute information.

19. The computer-readable storage media of claim 14, wherein the instructions, when executed, are further operable to update the next hop of the routing message to be associated with the routing bridge, when the nickname is determined not to be unique.

20. The computer-readable storage media of claim 14, wherein the processor on which the instructions are executable is incorporated in another routing bridge.

* * * * *